Oct. 29, 1929.  B. S. MINOR  1,733,508
ANTISWIVELING DEVICE FOR SUSPENSION HOOKS
Filed Oct. 24, 1927
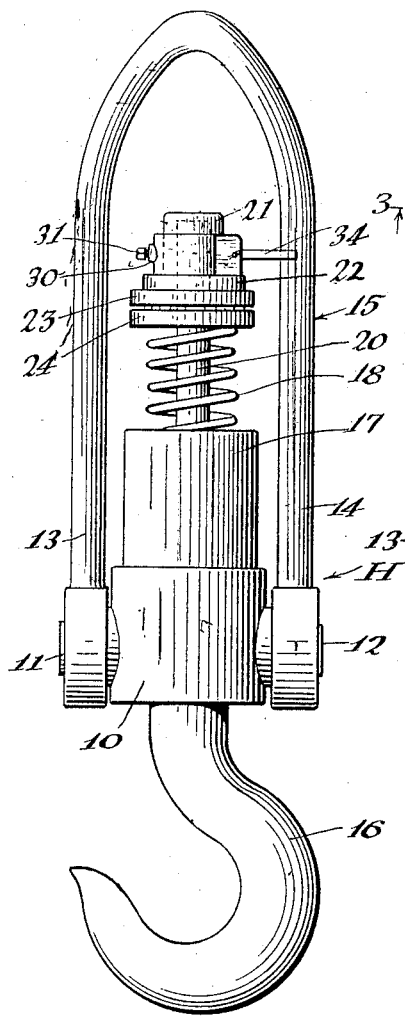
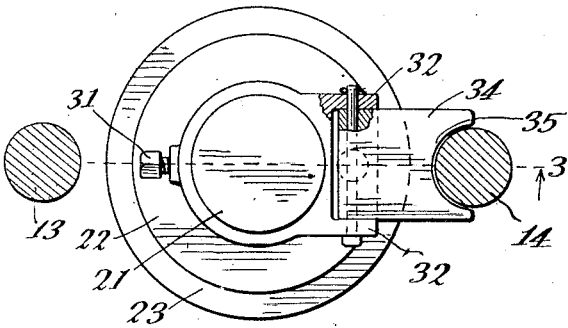
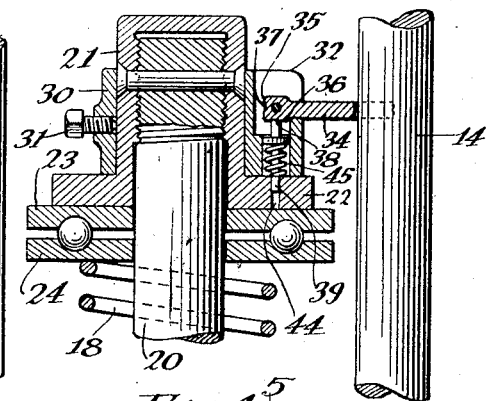
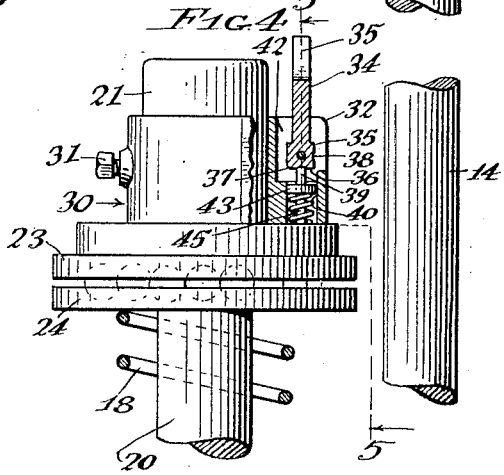
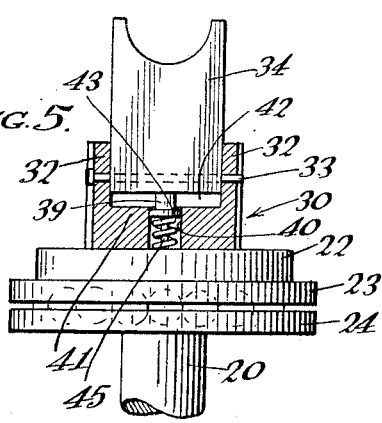
INVENTOR
BURT S. MINOR
ATTORNEY Patented Oct. 29, 1929

1,733,508

UNITED STATES PATENT OFFICE

BURT STANLEY MINOR, OF SAN PEDRO, CALIFORNIA, ASSIGNOR TO REGAN FORGE AND ENGINEERING COMPANY, OF SAN PEDRO, CALIFORNIA, A CORPORATION OF CALIFORNIA

ANTISWIVELING DEVICE FOR SUSPENSION HOOKS

Application filed October 24, 1927. Serial No. 228,282.

This invention relates more specifically to a device designed to be applied to a spring swiveling casing hook, such as the well-known "Wigle" type now generally employed in oil well drilling operations.

In the drilling of oil wells it is desirable to permit the casing hooks to swivel while running drill pipe in or out of a well, especially when coupling or uncoupling strings of pipe, but when drilling operations are resumed it is equally desirable to hold the hook against swiveling movement in order that the "mud hose" connected to the swivel will not become twisted around the "Kelly" and thus break or injure the same.

It is therefore an object of my invention to provide a simple latch device that may be quickly brought into or out of operative position to permit of or arrest a swiveling action of a spring swiveling casing hook.

Further objects and advantages will be apparent from the following specification, reference being had to the accompanying drawings in which:

Fig. 1 is a front elevation of a spring swiveling oil well casing hook equipped with the device.

Fig. 2 is an enlarged cross section taken on line 2—2 of Fig. 1 showing the latch in operative position.

Fig. 3 is a partial vertical section of the device taken on line 3—3 of Fig. 2 in an operative position.

Fig. 4 is an enlarged side elevation with the device in section and in inoperative position.

Fig. 5 is a cross section taken on line 5—5 of Fig. 4.

Referring now more specifically to the drawings the casing hook illustrated is of the type known to the oil trade as a "Wigle" spring hook. The hook —H— consists of a cross bar 10 provided with trunnions 11, 12, which are disposed in apertures in the arms 13, 14 of the yoke 15 to provide a pivotal connection. The yoke cross bar 10 is provided with a bore to receive the shank of the hook 16, and has a sleeve 17 in which is mounted a coiled compression spring 18 that serves as a resilient support for the hook 16 when the casing is pulled. Hook 16 is provided with a shank 20, its upper end being threaded for the reception of a cap nut 21 having a circular flange 22 that bears against the upper ball race-way disk 23, the lower disk 24 of the race-way bearing against the upper end of the coiled compression spring. As all of the above relates to the casing hook and forms no part of the present invention, further description is thought to be unnecessary.

Mounted on the cap nut 21 is a sleeve 30 held in position thereon by a set screw 31, and extending from its periphery are oppositely disposed bearing lugs 32 spaced apart. Pivotally mounted on a pin 33 secured in the lugs is a flat latch member 34, its outer end having a semi-circular recess 35 formed in its outer end of a slightly greater radius than the radius of the arm 14 of the yoke which it engages when in latched position. The pivotal end of the latch is rectangular in cross section and two of its sides 35 and 36 are each provided with a concaved pin seat 37, 38 adapted to be engaged by a pin 39 to hold the latch in either of its operative or inoperative positions. This pin 39 is mounted in a cylindrical bore 40 formed in the bottom wall 41 of the recess 42 of the sleeve. The pin adjacent its upper end has a disk 43 secured thereto and its lower end engages a bore 44 formed in flange 22 of the cap nut, a coiled compression spring 45 disposed on the pin below the disk 43 maintaining the latch member in a locked or unlocked position.

From the above description the operation will be clearly apparent. When the latch is in its inoperative position (see Fig. 4) and a non-swiveling action of the hook is desired, the operator merely forces the latch downwardly against the action of the pin spring 45 until the latch is in engagement with the arm 14 of the yoke which will effectually lock the hook against a swiveling movement.

What I claim is:

1. The combination with a yoke embodying parallel arms, a yoke cross bar carried by the lower end of the yoke arms, a hook having its shank rotatably and slidably directed through said bar and extending between the yoke arms, means for preventing a swiveling action of the hook comprising a latch arm pivotally mounted on the upper end of the hook shank, the outer end of said arm adapted to engage a yoke arm when the latch is swung to a latched position, and a spring pressed plunger mechanism on said yoke shank disposed below the inner end of the latch arm, the plunger engaging the latch arm to maintain the same against movement in either of its latched or unlatched positions.

2. The combination with a yoke embodying parallel arms, a yoke cross bar carried by the lower end of the yoke arms, a hook having its shank rotatably and slidably directed through said bar and extending between the yoke arms and a nut at the upper end of the shank, means for preventing a swiveling action of the hook comprising a sleeve engaging said nut and having a pair of vertically disposed bearing lugs formed on the periphery of said sleeve, a latch arm pivoted between said lugs, the outer end of said arm adapted to engage a yoke arm when the latch arm is swung to a latched position, and a spring pressed plunger mechanism disposed on said sleeve below the inner end of the latch arm, the plunger engaging the latch arm to maintain the same against movement in either of its latched or unlatched positions.

3. The combination with a yoke embodying parallel arms, a yoke cross bar carried by the lower end of the yoke arms, a hook having its shank rotatably and slidably directed through said bar and extending between the yoke arms and a nut at the upper end of the shank, means for preventing a swiveling action of the hook comprising a sleeve engaging said nut and having a pair of vertically disposed bearing lugs formed on the periphery of said sleeve, a latch arm having a squared inner end pivoted between said lugs, the outer end of said arm adapted to engage a yoke arm when the latch arm is swung to a latched position, and a spring pressed plunger mechanism disposed on said sleeve below the inner end of the latch arm, the plunger engaging one of the squared faces of the latch arm to maintain the same against movement in either of its latched or unlatched positions.

In testimony whereof I affix my signature.

BURT STANLEY MINOR.